(12) United States Patent
Zhou

(10) Patent No.: US 10,748,090 B2
(45) Date of Patent: Aug. 18, 2020

(54) METHOD AND APPARATUS FOR MACHINE-EXCEPTION HANDLING AND LEARNING RATE ADJUSTMENT

(71) Applicant: ALIBABA GROUP HOLDING LIMITED, George Town, Grand Cayman (KY)

(72) Inventor: Jun Zhou, Hangzhou (CN)

(73) Assignee: ALIBABA GROUP HOLDING LIMITED, George Town, Grand Cayman (KY)

( * ) Notice: Subject to any disclaimer, the term of this patent is extended or adjusted under 35 U.S.C. 154(b) by 101 days.

(21) Appl. No.: 16/043,006

(22) Filed: Jul. 23, 2018

(65) Prior Publication Data
US 2018/0329798 A1    Nov. 15, 2018

Related U.S. Application Data

(63) Continuation of application No. PCT/CN2017/070906, filed on Jan. 11, 2017.

(30) Foreign Application Priority Data

Jan. 21, 2016    (CN) .......................... 2016 1 0041708

(51) Int. Cl.
G06Q 10/04    (2012.01)
(52) U.S. Cl.
CPC .................................. G06Q 10/04 (2013.01)
(58) Field of Classification Search
CPC ..... G06Q 10/04; G06N 20/00; G06F 11/3419
(Continued)

(56) References Cited

U.S. PATENT DOCUMENTS 6,934,673 B2 *  8/2005  Alvarez ............... G06F 11/008
                                                    703/21
8,005,774 B2 *  8/2011  Chapelle ............. G06F 16/9535
                                                    706/16
(Continued)

FOREIGN PATENT DOCUMENTS

CN    101505243 A    8/2009
CN    104063747 A    9/2014
(Continued)

OTHER PUBLICATIONS 2010 10th IEEE/ACM International Conference on Cluster, Cloud and Grid Computing on the use of machine learning to predict the time and resource consumed by application pp. 495-503, 2010. Andrea Mastunaga and Jose Fortes Dept of Electrical and Computer Engineering, University of Florida.*

(Continued)

*Primary Examiner* — Tauqir Hussain
(74) *Attorney, Agent, or Firm* — Finnegan, Henderson, Farabow, Garrett & Dunner, LLP

(57)    ABSTRACT

The present disclosure provides machine-exception handling methods and learning rate adjustment methods and apparatuses. One exemplary method comprises: acquiring a gradient consumption time of a target machine, wherein the gradient consumption time is used to indicate a gradient related time consumed by the target machine in a training process; determining whether the gradient consumption time satisfies a predetermined condition compared with a pre-acquired average consumption time, wherein the average consumption time is used to indicate an average value of the gradient related time consumed by all machines other than the target machine in a cluster in the training process; and determining that the target machine is abnormal if the gradient consumption time satisfies the predetermined condition compared with the average consumption time. The (Continued)

present disclosure addresses the technical problem of high training costs caused by low computation or communication speeds of some machines in a cluster.

16 Claims, 10 Drawing Sheets

(58) Field of Classification Search
USPC .......................................................... 709/224
See application file for complete search history.

(56) References Cited

U.S. PATENT DOCUMENTS

| | | | |
|---|---|---|---|
| 8,332,411 B2 | 12/2012 | Burges et al. | |
| 8,897,604 B2* | 11/2014 | Deng | G06T 7/0002 |
| | | | 382/305 |
| 8,984,317 B2* | 3/2015 | Ernst | G06F 1/3203 |
| | | | 713/324 |
| 9,053,386 B2* | 6/2015 | Xue | G06K 9/6202 |
| 9,575,548 B2* | 2/2017 | Masuno | G06F 9/5088 |
| 9,625,274 B2* | 4/2017 | Burns | G05D 7/0629 |
| 10,108,513 B2* | 10/2018 | Yuan | G05B 23/0224 |
| 10,318,882 B2* | 6/2019 | Brueckner | H04L 67/10 |
| 10,354,187 B2* | 7/2019 | Kasravi | G06N 3/084 |
| 10,452,995 B2* | 10/2019 | Burger | G06F 9/46 |
| 2002/0157035 A1 | 10/2002 | Wong et al. | |
| 2010/0329545 A1 | 12/2010 | Moore et al. | |
| 2014/0310218 A1* | 10/2014 | Min | G06N 3/08 |
| | | | 706/16 |
| 2016/0051751 A1* | 2/2016 | Silkaitis | G06Q 50/22 |
| | | | 604/151 |
| 2016/0078361 A1* | 3/2016 | Brueckner | H04L 67/10 |
| | | | 706/12 |

FOREIGN PATENT DOCUMENTS

| | | |
|---|---|---|
| CN | 104644143 A | 5/2015 |
| WO | WO 2017/124953 A1 | 7/2017 |

OTHER PUBLICATIONS

PCT International Search Report and Written Opinion dated Apr. 14, 2017, issued in corresponding International Application No. PCT/CN2017/070906 (15 pages).

Extended European Search Report pursuant to Rule 62 EPC, the Supplementary European Search Report (Art. 153(7) EPC) and the European Search Opinion issued in EPO Application No. 17740984.4 dated Dec. 6, 2018 (8 pages).

First Chinese Search Report issued in Chinese Application No. CN2016100417080, dated Nov. 4, 2019, 2 pages.

* cited by examiner

METHOD AND APPARATUS FOR MACHINE-EXCEPTION HANDLING AND LEARNING RATE ADJUSTMENT

This application claims priority to International Application No. PCT/CN2017/070906, filed on Jan. 11, 2017, which claims priority to and the benefits of priority to Chinese Application No. 201610041708.0, filed on Jan. 21, 2016, both of which are incorporated herein by reference in their entireties.

TECHNICAL FIELD

The present disclosure generally relates to the field of internet technologies, and in particular, to methods and apparatuses for machine-exception handling and learning rate adjustment.

BACKGROUND

Internet companies usually have a large amount of user behavior data. Machine learning methods are usually used to extract useful information such as user preferences from such data. The extracted information can be used to improve user experience and increase revenues of internet companies.

A core approach of machine learning is to find the minimum of a loss function. A loss function is a function for measuring loss or error. For example, with respect to website search, if the loss function is smaller, it means the probability that a user clicks on a found webpage is higher. Gradient descent (a gradient is a vector, a derivative of a loss function with respect to the weights) is a widely used method for finding the minimum of a loss function in machine learning. For example, it is used in various optimization techniques, given its relatively simple implementation and fast calculation. A learning rate (also called Eta) is an important parameter in weight updates. A weight is a vector and may be understood as an independent variable of a loss function. Learning rates can affect convergence in the training process. If Eta is too large, each round of iteration may go too far and miss an optimal solution. If Eta is too small, each round of iteration may be too slow and affect the speed of convergence.

At present, when large-scale machine learning is used to solve problems, training is usually performed using clusters. A cluster can include a plurality of machines. Machines may have different loads at different time points. Some machines have high computing speeds. Some machines have light communication loads and accordingly high communication efficiency. However, some machines may have very high loads and consequently very low computing speeds. Some machines may also have very low communication speeds because of low-level configurations. As a result, the entire training process can be very slow. A large amount of machine resources are required in the training process, and enormous financial costs are incurred. For example, assuming 800 machines are needed to train one user preference, and the cost of one machine per hour is C, and the training takes a total of T hours, the cost would be 800×C×T. If C is greater than 1000 and T is greater than 100, the cost of successful training is at least 80,000,000. If a failure occurs during the training process, the training process needs to be started again, and the costs can be even higher.

In view of the above, there is a need for effective solutions to the foregoing problems.

SUMMARY

Embodiments of the present disclosure provide methods and apparatuses for machine-exception handling and learning rate adjustment. One objective of the present disclosure is to address the technical problem of high training costs caused by low computing or communication speeds of some machines in a cluster.

According to some embodiments of the present disclosure, machine-exception handling methods are provided. One exemplary method comprises: acquiring a gradient consumption time of a target machine, wherein the gradient consumption time is used to indicate a gradient related time consumed by the target machine in a training process; determining whether the gradient consumption time satisfies a predetermined condition compared with a pre-acquired average consumption time, wherein the average consumption time is used to indicate an average value of the gradient related time consumed by all machines other than the target machine in a cluster in the training process; and determining that the target machine is abnormal if the gradient consumption time satisfies the predetermined condition compared with the average consumption time.

According to some embodiments of the present disclosure, learning rate adjustment methods are provided. One exemplary learning rate adjustment method comprises: acquiring a gradient calculated by a target machine; calculating a learning rate corresponding to the gradient; determining whether the learning rate is less than a preset threshold; and stopping a weight update operation if the learning rate is less than the preset threshold, or performing the weight update operation if the learning rate is greater than or equal to the preset threshold.

According to some embodiments of the present disclosure, machine-exception handling apparatuses are provided. One exemplary machine-exception handling apparatus comprises: a first acquisition unit configured to acquire a gradient consumption time of a target machine, wherein the gradient consumption time is used to indicate a gradient related time consumed by the target machine in a training process; a determination unit configured to determine whether the gradient consumption time satisfies a predetermined condition compared with a pre-acquired average consumption time, wherein the average consumption time is used to indicate an average value of the gradient related time consumed by all machines other than the target machine in a cluster in the training process; and a detection unit configured to determine that the target machine is abnormal if the gradient consumption time satisfies the predetermined condition compared with the average consumption time.

According to some embodiments of the present disclosure, learning rate adjustment apparatuses are provided. One exemplary learning rate adjustment apparatus comprises: a second acquisition unit configured to acquire a gradient calculated by a target machine; a calculation unit configured to calculate a learning rate corresponding to the gradient; a processing unit configured to determine whether the learning rate is less than a preset threshold; and stopping a weight update operation if the learning rate is less than the preset threshold, or performing the weight update operation if the learning rate is greater than or equal to the preset threshold.

According to the embodiments of the present disclosure, a gradient consumption time of a target machine can be acquired. The gradient consumption time can indicate a gradient related time consumed by the target machine in a training process. It can be determined whether the gradient consumption time satisfies a predetermined condition compared with a pre-acquired average consumption time, wherein the average consumption time is used to indicate an average value of the gradient related time consumed by all machines other than the target machine in a cluster in the training process. It can be determined that the target machine is abnormal, if the gradient consumption time satisfies the predetermined condition compared with the average consumption time. In this manner, a gradient consumption time of a target machine can be compared with an average consumption time of all machines other than the target machine, to determine whether the target machine is abnormal. When the target machine is abnormal, the training strategy can be adjusted promptly to avoid the problem of increased training costs caused by low computation or communication speeds of some machines. That way, the objective of promptly determining an abnormal machine in a cluster can be achieved. Further, the technical effect of reducing training costs can be achieved. The technical problem of high training costs caused by low computation or communication speeds of some machines in the cluster can therefore be effectively addressed.

BRIEF DESCRIPTION OF THE DRAWINGS

The accompanying drawings described here are used to provide further illustration to facilitate understanding of the present disclosure. The accompanying drawings constitute a part of the present disclosure. The exemplary embodiments of the present disclosure and the description herein are used to explain the present disclosure. They are not intended to limit the scope of the present disclosure in any way. In the accompanying drawings.

DETAILED DESCRIPTION

To enable those skilled in the art to better understand the solutions provided by the present disclosure, exemplary technical solutions according to some embodiments of the present disclosure are described below with reference to the accompanying drawings. Apparently, the described embodiments are merely a part (rather than all) of the embodiments of the present disclosure. Other embodiments can be obtained by those of ordinary skill in the art based on the exemplary embodiments of the present disclosure and the disclosure herein, without departing from the concept and principles of the present disclosure. Such embodiments shall fall within the protection scope of the present disclosure.

It is appreciated that the terms "first," "second," and the like used in the present disclosure, the claims of the present disclosure, and the accompanying drawings are only used to distinguish similar objects. Such terms do not necessarily describe a particular order or time sequence. It is appreciated that the terms thus used are interchangeable in appropriate circumstances, and that the embodiments of the present disclosure can be implemented in other sequences different from those illustrated or described herein. Moreover, the terms "comprise" and "have" or any variation of such terms are intended to cover a non-exclusive inclusion. For example, a process, method, system, product, or device that includes a series of steps or units may not only include those steps or units specified expressly, but also other steps or units that are not specified expressly or are inherent to the process, method, product or device.

According to some embodiments of the present disclosure, machine-exception handling methods are provided. It is appreciated that the steps shown in the flowcharts in the accompanying drawings may be performed in a computer system executing a set of computer executable instructions. Moreover, although an order of procedures is shown in the flowcharts, it is appreciated that in some circumstances, the shown or described steps may be performed in an order different from that illustrated herein.

According to some embodiments, the methods provided by the present disclosure may be performed by a mobile terminal, a computer terminal, or a similar operational apparatus. For example, FIG. 1 is a structural block diagram of hardware of an exemplary computer terminal 100 that can be used to perform a machine-exception handling method according to some embodiments of the present disclosure.

Figure 1:
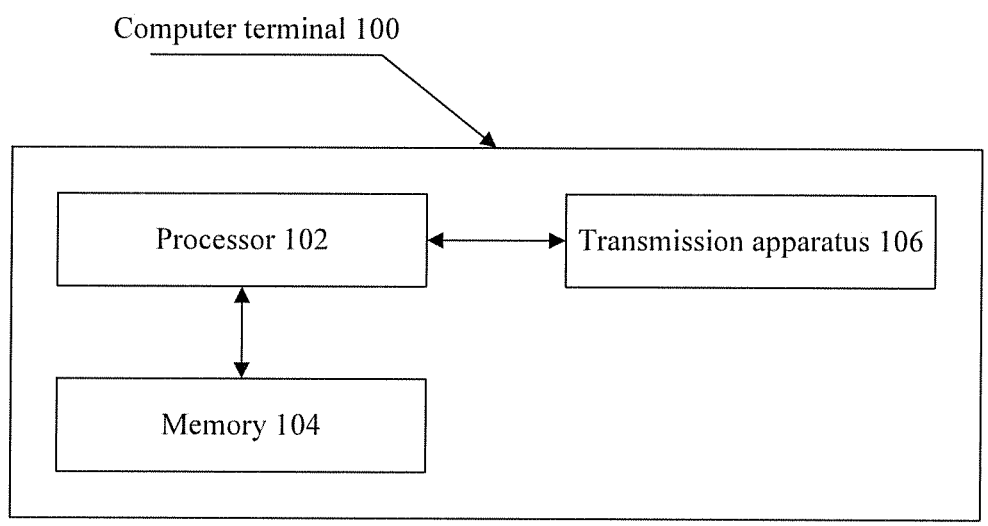
FIG. 1 is a structural block diagram of hardware of an exemplary computer terminal that can be used to perform a machine-exception handling method according to some embodiments of the present disclosure.

As shown in FIG. 1, the computer terminal 100 may include one or more (only one is shown in the figure) processors 102, a memory 104, and a transmission apparatus 106. The processor 102 may include, but is not limited to, a processing apparatus such as a microcontroller unit (MCU) or a programmable logic device FPGA). The memory 104 can be configured to store data. The transmission apparatus 106 can be configured to perform a communication function. It is appreciated that the structure shown in FIG. 1 is only schematic and exemplary. It does not limit the structure of the foregoing electronic components. For example, the computer terminal 100 may further include more or fewer components than those shown in FIG. 1, or have a configuration different from that shown in FIG. 1.

The memory 104 may be configured to store software programs and modules of application software, for example, program instructions/modules corresponding to the machine-exception handling methods provided by the present disclosure. The processor 102 can execute the software programs and modules stored in the memory 104, to perform various functions and data processing procedures, according to the machine-exception handling methods provided by the present disclosure. The memory 104 may include a high-speed random-access memory (RAM), and may further include a non-volatile memory, for example, one or more magnetic storage apparatuses, flash memories, or other non-volatile solid-state memories. In some embodiments, the memory 104 may further include memories that are remotely disposed relative to the processor 102. These remote memories may be connected to the computer terminal 100 via a network. The foregoing network can include, but is not limited to, the internet, an intranet, a local area network, a mobile communications network, and a combination thereof.

The transmission apparatus 106 can be configured to receive or send data via a network. Examples of the foregoing network may include a wireless network provided by a communications provider of the computer terminal 100. In some embodiments, the transmission apparatus 106 can include a network interface controller (NIC), which can be connected to another network device via a base station to communicate with the internet. Further, the transmission apparatus 106 can be a radio frequency (RF) module, and can be configured to wirelessly communicate with the internet.

Figure 2:
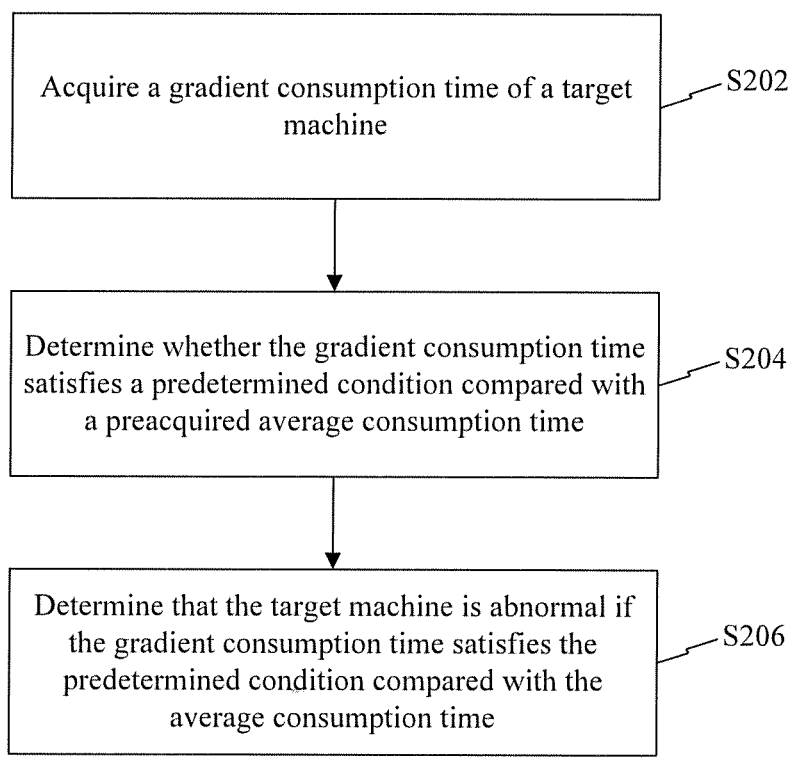
FIG. 2 is a schematic flowchart of an exemplary machine-exception handling method according to some embodiments of the present disclosure.

According to some embodiments of the present disclosure, machine-exception handling methods are provided. For example, some methods can be performed in the foregoing operation environment described with reference to FIG. 1. FIG. 2 is a flowchart of an exemplary machine-exception handling method 200 according to some embodiments of the present disclosure.

In step S202, a gradient consumption time of a target machine can be acquired. In some embodiments, the gradient consumption time can be used to indicate a gradient related time consumed by the target machine in a training process. For example, the gradient consumption time can include a first time consumed by the target machine to calculate a gradient and/or a second time consumed by the target machine to send the gradient.

In step S204, it can be determined whether the gradient consumption time satisfies a predetermined condition compared with a pre-acquired average consumption time. In some embodiments, the average consumption time can be used to indicate an average value of the gradient related time consumed by all machines other than the target machine in a cluster in the training process. In some embodiments, the average consumption time can include a first average value of time consumed by all other machines in the cluster to calculate a gradient and/or a second average value of time consumed by all other machines in the cluster to send the gradient.

In some embodiments, determining whether the gradient consumption time satisfies a predetermined condition compared with a pre-acquired average consumption time can further include: determining whether the first time is greater than a product of the first average value and a first preset coefficient. If the first time is greater than the product of the first average value and the first preset coefficient, it can be determined that the gradient consumption time satisfies the predetermined condition compared with the average consumption time. If the first time is less than or equal to the product of the first average value and the first preset coefficient, it can be determined that the gradient consumption time does not satisfy the predetermined condition compared with the average consumption time. Alternatively or additionally, determining whether the gradient consumption time satisfies a predetermined condition compared with a pre-acquired average consumption time can further include: determining whether the second time is greater than a product of the second average value and a second preset coefficient. If the second time is greater than the product of the second average value and the second preset coefficient, it can be determined that the gradient consumption time satisfies the predetermined condition compared with the average consumption time. If the second time is less than or equal to the product of the second average value and the second preset coefficient, it can be determined that the gradient consumption time does not satisfy the predetermined condition compared with the average consumption time.

In step S206, it can be determined that the target machine is abnormal if the gradient consumption time satisfies the predetermined condition compared with the average consumption time. For example, in the forgoing described scenario, if the first time is greater than the product of the first average value and the first preset coefficient, and/or, if the second time is greater than the product of the second average value and the second preset coefficient, it can be determined that the target machine is abnormal.

The exemplary machine-exception handling method 200 described above includes, but is not limited to, making determinations based on two dimensions, that is, a time consumed by a machine to calculate a gradient and a time consumed by a machine to send the gradient. The predetermined condition can be that if the target machine has not sent the gradient when a product of an average value of gradient sending time and the second preset coefficient (the second preset coefficient may be, for example, 2) ends, it can be considered that the target machine is an abnormal machine. That is, assuming that nine out of ten machines have sent the gradient within 5 seconds but the target machine has not sent the gradient after 10 seconds, it can be considered that the target machine is a slow machine. Alternatively or additionally, when the target machine still has not calculated the gradient after a product of an average time consumed by all other machines to calculate a gradient and the first preset coefficient (the first preset coefficient may be, for example, 3) ends, it can be considered that the target machine is an abnormal machine.

After it is determined that the target machine is abnormal, a currently returned gradient of other machines may be used to perform a weight update operation without waiting for the gradient of the abnormal machines. All machines can then be instructed to enter a next round of iteration. As such, the system does not have to wait for the abnormal machine, therefore a large amount of time can be saved. Implementation manners are further described in detail in the following exemplary embodiments.

In view of the above, according to some embodiments of the present disclosure, a gradient consumption time of a target machine can be compared with an average consumption time of all other machines, to determine whether the target machine is abnormal. When the target machine is abnormal, a training strategy can be adjusted promptly to avoid increased training costs caused by low computation or communication speeds of machines such as those determined to be abnormal. That way, the objective of promptly determining an abnormal machine in a cluster can be achieved. The technical effect of reducing training costs can be achieved. The technical problem of high training costs caused by low computation or communication speeds of some machines in the cluster can be effectively addressed.

Figure 3:
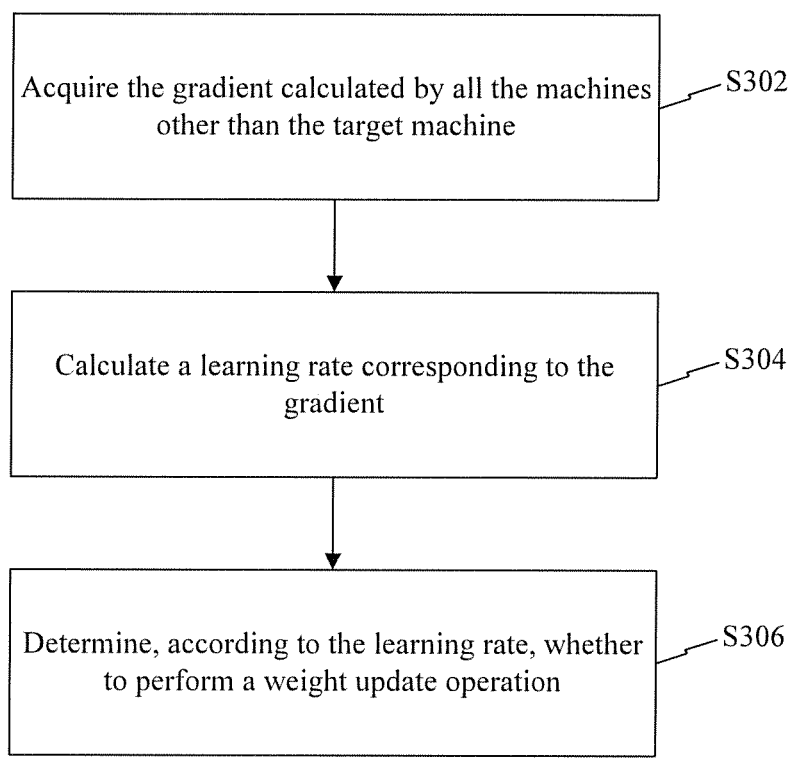
FIG. 3 is a schematic flowchart of an exemplary machine-exception handling method according to some embodiments of the present disclosure.

FIG. 3 is a schematic flowchart of an exemplary machine-exception handling method 300 according to some embodiments of the present disclosure. As shown in FIG. 3, after it is determined that the target machine is abnormal, the machine-exception handling method may further include the following procedures.

In step S302, the gradient calculated by all the machines other than the target machine can be acquired. In some embodiments, after it is determined that the target machine is abnormal, currently returned gradient (that is, the gradient calculated by all the machines other than the target machine) can be directly acquired without waiting for the gradient of the abnormal target machine.

In step S304, a learning rate corresponding to the gradient can be calculated according to the gradient. In some embodiments, the method of calculating a learning rate corresponding to the gradient may include calculating the learning rate by using a formula: Eta(i)=A×$i^{th}$ dimensional gradient/(B+sqrt(sum($i^{th}$ dimensional gradient×$i^{th}$ dimensional gradient))). In the above formula, Eta(i) is the learning rate, A is the first preset coefficient, B is the second preset coefficient, the gradient is a vector formed by n $i^{th}$ dimensional gradients, n is a number of dimensions of the gradient, and 0<i≤n. Moreover, sum($i^{th}$ dimensional gradient×$i^{th}$ dimensional gradient) is a summation operation of the squares of an $i^{th}$ dimensional gradient of a current round of iteration and an $i^{th}$ dimensional gradient of M rounds of iteration before the current round. M may be, for example, 20, and the number is not limited by the current example.

In step S306, it can be determined, according to the learning rate, whether to perform a weight update operation. In some embodiments, the step of determining, according to the learning rate, whether to perform a weight update operation can include: determining whether the learning rate is less than a preset threshold; and stopping the weight update operation if the learning rate is less than the preset threshold, or performing the weight update operation if the learning rate is greater than or equal to the preset threshold.

In some embodiments, the preset threshold can be $1e^{-5}$, that is, 1 multiplied by 10 to the power of negative 5.

In some embodiments, the step of performing the weight update operation can include calculating an updated weight according to the learning rate, the gradient, and a historical weight. For example, the step of calculating an updated weight according to the learning rate, the gradient, and a historical weight can include calculating the updated weight by using a formula as follows: updated weight=historical weight+(−learning rate×gradient). In the above formula, the historical weight indicates a weight used by the target machine during a current round of iteration, and the updated weight indicates a weight that needs to be used by the machine in a next round of iteration.

In some embodiments, after the step of performing the weight update operation, the machine-exception handling method 300 may further include the following procedures.

The updated weight can be sent to the target machine and all the machines other than the target machine, to instruct the target machine and all the machines other than the target machine to perform training according to the updated weight.

After it is determined that the target machine is abnormal, the weight update operation can be directly performed according to a currently returned gradient of the machines without waiting for the gradient returned by the target machine. The updated weight can then be sent to all machines, to instruct all the machines to enter a next round of iteration. That way, a large amount of time can be saved.

In view of the above-described machine-exception handling method embodiments, an abnormal machine in a cluster can be detected and circumvented, to prevent an interruption during the training, the wait for a slow machine, or the like. The training process can be accelerated and the costs can be reduced. Further, information such as a gradient and the number of iterations can be fully utilized to automatically adjust the learning rate. Different learning rates can be used for weights of different dimensions, so that better convergence can be obtained in each dimension, which can further accelerate the training process and reduce costs.

In light of the above, in conventional systems, there can be many machines in a cluster. The load on the machines can be very high and consequently the computation can be very slow. Some machines may also have very slow communication speeds because of low-level configurations. As a result, with the existing techniques, the entire training process can be very slow, and a large amount of machine resources are required, which can cause huge costs of financial resources. According to the machine-exception handling method embodiments of the present disclosure as described above, a gradient consumption time of a target machine can be compared with an average consumption time of all machines other than the target machine, to determine whether the target machine is abnormal. When the target machine is abnormal, a training strategy can be adjusted promptly to avoid increased training costs caused by low computation or communication speeds of some machines. That way, some of the objectives of efficiently determining an abnormal machine in a cluster can be achieved, and training costs can be reduced.

According to some embodiments of the present disclosure, methods for learning rate adjustment are provided. It is appreciated that the steps shown in the flowcharts of the accompanying drawings can be performed in a computer system executing a set of computer executable instructions. Moreover, although an order of procedures is shown in the flowcharts, in some circumstances, the procedures may be performed in an order different from the one described here.

Figure 4:
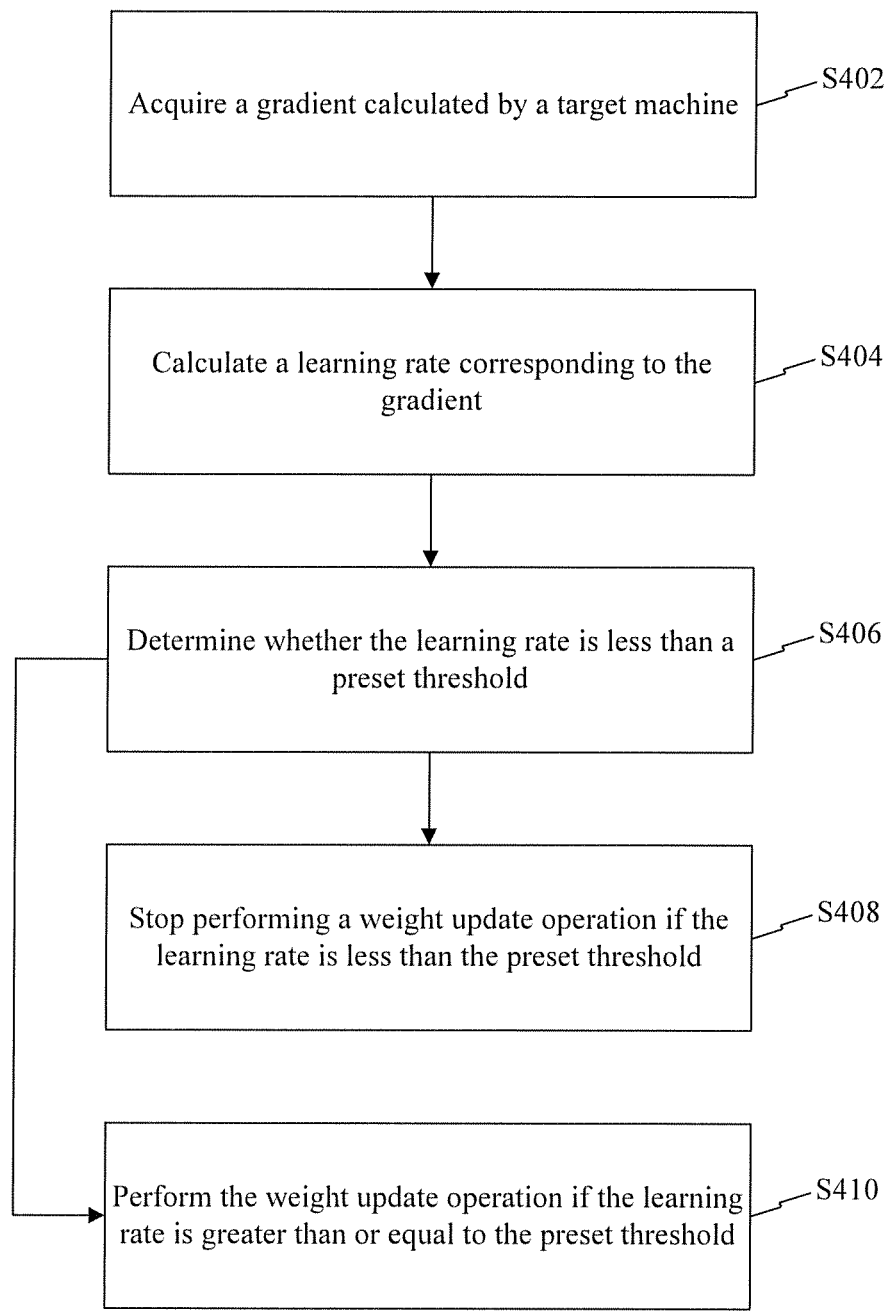
FIG. 4 is a schematic flowchart of an exemplary learning rate adjustment method according to some embodiments of the present disclosure.

FIG. 4 is a flowchart of an exemplary learning rate adjustment method 400 according to some embodiments of the present disclosure. As shown in FIG. 4, the exemplary method 400 can include the following procedures.

In step S402, a gradient calculated by a target machine can be acquired. In some embodiments, the gradient can be a value obtained by obtaining the derivative of a loss function. The loss function can be a function that maps an event (an element of a sample space) onto a real number representing an economic cost or opportunity cost related to the event.

In step S404, a learning rate corresponding to the gradient can be calculated according to the gradient. In some embodiments, the step of calculating a learning rate corresponding to the gradient can include calculating the learning rate by using the following formula: Eta(i)=A×$i^{th}$ dimensional gradient/(B+sqrt(sum($i^{th}$ dimensional gradient×$i^{th}$ dimensional gradient))). In the above formula, Eta(i) is the learning rate, A is a first preset coefficient, B is a second preset coefficient, the gradient is a vector formed by n $i^{th}$ dimensional gradients, n is a number of dimensions of the gradient, and 0<i≤n. Moreover, sum($i^{th}$ dimensional gradient×$i^{th}$ dimensional gradient) is a summation operation of the squares of an $i^{th}$ dimensional gradient of a current round of iteration and an $i^{th}$ dimensional gradient of M rounds of iterations before the current round. M may be, for example, 20, and the number is not limited by this example.

In step S406, it can be determined whether the learning rate is less than a preset threshold. In some embodiments, the preset threshold may be $1e^{-5}$, that is, 1 multiplied by 10 to the power of negative 5.

In step S408, performance of a weight update operation can be stopped if the learning rate is less than the preset threshold.

In step S410, the weight update operation can be performed if the learning rate is greater than or equal to the preset threshold. In some embodiments, the step of performing the weight update operation can include calculating an updated weight according to the learning rate, the gradient, and a historical weight. For example, the step of calculating an updated weight according to the learning rate, the gradient, and a historical weight can include calculating the updated weight by using the following formula: updated weight=historical weight+(−learning rate×gradient).

In some embodiments, after performing the weight update operation, the machine-exception handling method 400 can further include sending the updated weight to the target machine to instruct the target machine to perform training according to the updated weight.

With the exemplary machine-exception handling method 400, information such as a gradient and the number of iterations can be utilized to automatically adjust a learning rate. Different learning rates can be used for weights of different dimensions, so that better convergence can be obtained in each dimension, which can accelerate the training process and reduce costs.

In view of the above, in some embodiments of the present disclosure, a corresponding learning rate can be calculated according to a gradient of a target machine. The performance of a weight update operation can be stopped if the learning rate is less than a preset threshold. That way, the training time can be shortened and the technical effect of reducing training costs can be achieved.

The foregoing exemplary method embodiments are described as a series of action combinations. It is appreciated that the present disclosure is not limited to the described order of procedures. In other embodiments, some procedures can be performed in a different order or can be performed simultaneously. Further, it is appreciated that the embodiments described herein are only exemplary. The described actions or modules are not necessarily required by every embodiment of the present disclosure.

In light of the description of the foregoing exemplary embodiments, it should be appreciated that the methods provided by the present disclosure may be implemented by software plus a universal hardware platform or may be implemented by hardware. Based on such understanding, the technical solutions of the present disclosure or a part thereof may be implemented in the form of a software product. The computer software product can be stored in a storage medium (for example, a read-only memory (ROM)/RAM, a magnetic disk, and an optical disc). For example, the storage medium can store several instructions for instructing a terminal device (which may be a mobile phone, a computer, a server, a network device, or the like) to perform the methods provided by the embodiments of the present disclosure.

According to some embodiments of the present disclosure, apparatuses that can implement the foregoing embodiments of machine-exception handling methods are provided. For example, the apparatus can be a computer terminal which can perform the above-described methods.

Figure 5:
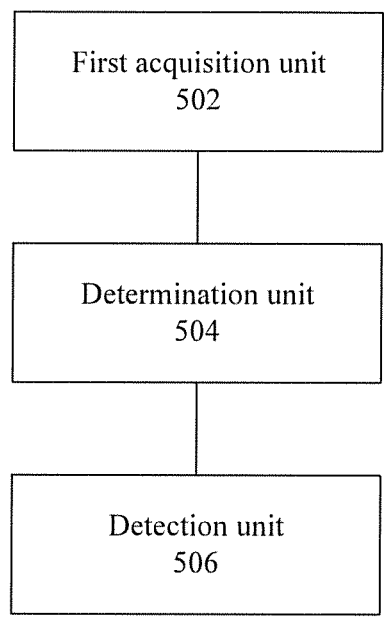
FIG. 5 is a schematic structural diagram of an exemplary machine-exception handling apparatus according to some embodiments of the present disclosure.

FIG. 5 is a schematic structural diagram of an exemplary machine-exception handling apparatus 500 according to some embodiments of the present disclosure.

As shown in FIG. 5, the exemplary machine-exception handling apparatus 500 can include a first acquisition unit 502, a determination unit 504, and a detection unit 506.

The first acquisition unit 502 can be configured to acquire a gradient consumption time of a target machine. The gradient consumption time can be used to indicate a gradient related time consumed by the target machine in a training process. The determination unit 504 can be configured to determine whether the gradient consumption time satisfies a predetermined condition compared with a pre-acquired average consumption time. The average consumption time can be used to indicate an average value of the gradient related time consumed by all machines other than the target machine in a cluster in the training process. The detection unit 506 can be configured to determine that the target machine is abnormal if the gradient consumption time satisfies the predetermined condition compared with the average consumption time.

In view of the foregoing, in some embodiments of the present disclosure, a gradient consumption time of a target machine can be compared with an average consumption time of all machines other than the target machine to determine whether the target machine is abnormal. When the target machine is abnormal, a training strategy can be adjusted in time to avoid training costs caused by low computation or communication speeds of some machines. That way, at least some of the objectives of efficiently determining an abnormal machine in a cluster can be achieved. The training costs can be reduced, and the technical problem of high training costs caused by low computation or communication speeds of some machines in the cluster can be addressed.

It is appreciated that the first acquisition unit 502, the determination unit 504, and the detection unit 506 can perform processes similar to those described above with reference to FIG. 2. For example, the first acquisition unit 502, the determination unit 504, and the detection unit 506 can perform the operations corresponding to steps S202-S206 respectively. Further, the first acquisition unit 502, the determination unit 504, and the detection unit 506 can also operate as part of the computer terminal 100 described above with reference to FIG. 1, either in the form of software or hardware.

In some embodiments, the gradient consumption time can include a first time consumed by the target machine to calculate a gradient and/or a second time consumed by the target machine to send the gradient. Correspondingly, the average consumption time can include a first average value of time consumed by all the machines other than the target machine in a system to calculate a gradient and/or a second average value of time consumed by all the machines other than the target machine to send the gradient.

In some embodiments, the determination unit 504 can be configured to determine whether the gradient consumption time satisfies a predetermined condition compared with a pre-acquired average consumption time by performing the following procedures: determining whether the first time is greater than a product of the first average value and a first preset coefficient. If the first time is greater than the product of the first average value and the first preset coefficient, it can be determined that the gradient consumption time satisfies the predetermined condition compared with the average consumption time. If the first time is less than or equal to the product of the first average value and the first preset coefficient, it can be determined that the gradient consumption time does not satisfy the predetermined condition compared with the average consumption time.

Additionally or alternatively, the determination unit 504 can be configured to determine whether the gradient consumption time satisfies a predetermined condition compared with a pre-acquired average consumption time by performing the following procedures: determining whether the second time is greater than a product of the second average value and a second preset coefficient. If the second time is greater than the product of the second average value and the second preset coefficient, it can be determined that the gradient consumption time satisfies the predetermined condition compared with the average consumption time. If the second time is less than or equal to the product of the second average value and the second preset coefficient, it can be determined that the gradient consumption time does not satisfy the predetermined condition compared with the average consumption time.

Figure 6:
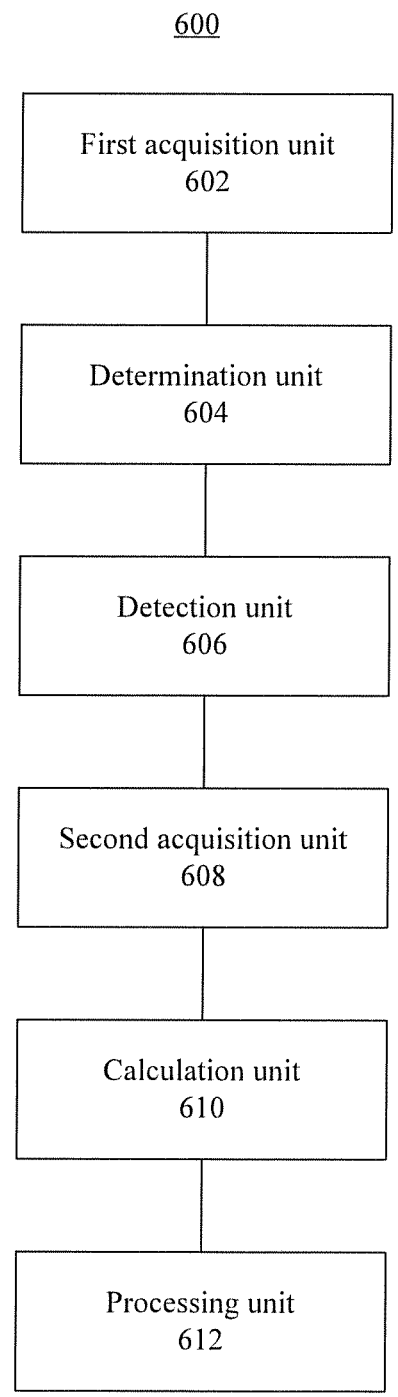
FIG. 6 is a schematic structural diagram of an exemplary machine-exception handling apparatus according to some embodiments of the present disclosure.

FIG. 6 is a schematic structural diagram of an exemplary machine-exception handling apparatus 600 according to some embodiments of the present disclosure. As shown in FIG. 6, the exemplary apparatus 600 can include a first acquisition unit 602, a determination unit 604, a detection unit 606, a second acquisition unit 608, a calculation unit 610, and a processing unit 612. The first acquisition unit 602, the determination unit 604, and the detection unit 606 can correspond to the units described above with reference to FIG. 5.

The second acquisition unit 608 can be configured to acquire the gradient calculated by all the machines other than the target machine. The calculation unit 610 can be configured to calculate a learning rate corresponding to the gradient. The processing unit 612 can be configured to determine, according to the learning rate, whether to perform a weight update operation.

It is appreciated that the second acquisition unit 608, the calculation unit 610, and the processing unit 612 can perform operations similar to those described above in the method embodiments. For example, the second acquisition unit 608, the calculation unit 610, and the processing unit 612 can perform the processes corresponding to step S302 to step S306 described above with reference to FIG. 3. It is appreciated that the foregoing modules may be operated as a part of the apparatus in the computer terminal 100 described with reference to FIG. 1, either in the form of software or hardware.

In some embodiments, the calculation unit 604 can be configured to calculate a learning rate corresponding to the gradient by calculating the learning rate based on the following formula: $Eta(i)=A \times i^{th}$ dimensional gradient$/(B+sqrt(sum(i^{th}$ dimensional gradient$\times i^{th}$ dimensional gradient$)))$. In the formula, $Eta(i)$ is the learning rate, A is the first preset coefficient, B is the second preset coefficient, the gradient is a vector formed by n $i^{th}$ dimensional gradients, n is a number of dimensions of the gradient, and $0<i \leq n$.

Figure 7:
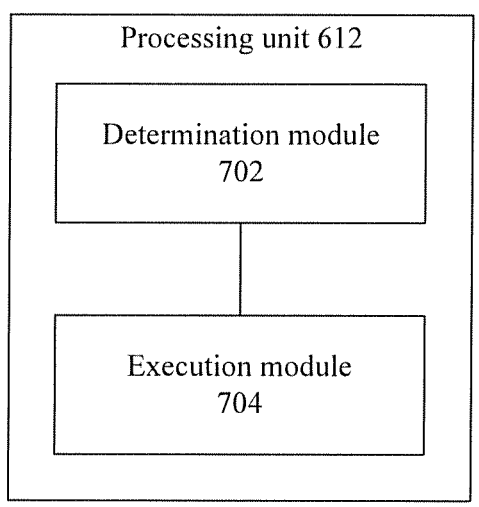
FIG. 7 is a schematic structural diagram of an exemplary processing unit according to some embodiments of the present disclosure.

In some embodiments, as shown in FIG. 7, the processing unit 612 can include a determination module 702 and an execution module 704.

The determination module 702 can be configured to determine whether the learning rate is less than a preset threshold. The execution module 704 can be configured to stop the weight update operation if the learning rate is less than the preset threshold, or perform the weight update operation if the learning rate is greater than or equal to the preset threshold.

In some embodiments, the execution module 704 can be configured to perform the weight update operation by performing the following procedures: calculating an updated weight according to the learning rate, the gradient, and a historical weight.

In some embodiments, the execution module 704 can be configured to calculate an updated weight according to the learning rate, the gradient, and a historical weight by calculating the updated weight according to the following formula: updated weight=historical weight+(−learning rate×gradient).

Figure 8:
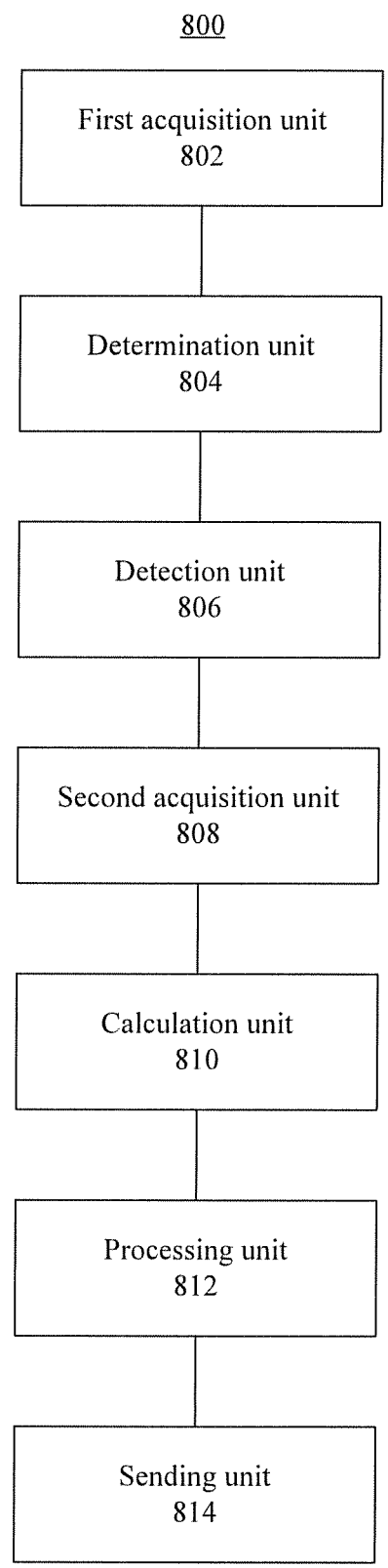
FIG. 8 is a schematic structural diagram of an exemplary machine-exception handling apparatus according to some embodiments of the present disclosure.

FIG. 8 is a schematic structural diagram of an exemplary machine-exception handling apparatus 800 according to some embodiments of the present disclosure. As shown in FIG. 8, the exemplary apparatus 800 can include a first acquisition unit 802, a determination unit 804, a detection unit 806, a second acquisition 808, a calculation unit 810, a processing unit 812, and a sending unit 814. The first acquisition unit 802, the determination unit 804, the detection unit 806, the second acquisition 808, the calculation unit 810, and the processing unit 812 can correspond to the units in exemplary apparatus 600 described above with reference to FIG. 6.

The sending unit 814 can be configured to send the updated weight to the target machine and all the machines other than the target machine, to instruct the target machine and all the machines other than the target machine to perform training according to the updated weight.

According to some embodiments, apparatuses for learning rate adjustments are is provided. For example, the apparatus can be a computer terminal performing the learning rate adjustments provided by the present disclosure.

Figure 9:
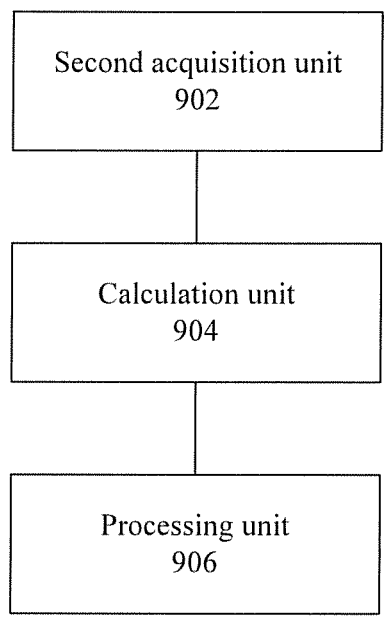
FIG. 9 is a schematic structural diagram of an exemplary learning rate adjustment apparatus according to some embodiments of the present disclosure.

FIG. 9 is a schematic structural diagram of a learning rate adjustment apparatus 900 according to embodiment of the present disclosure. As shown in FIG. 9, the learning rate adjustment apparatus can include a second acquisition unit 902, a calculation unit 904, and a processing unit 906.

The second acquisition unit 902 can be configured to acquire a gradient calculated by a target machine. The calculation unit 904 can be configured to calculate a learning rate corresponding to the gradient. The processing unit 906 can be configured to determine whether the learning rate is less than a preset threshold; and stopping a weight update operation if the learning rate is less than the preset threshold, or performing the weight update operation if the learning rate is greater than or equal to the preset threshold.

In view of the above, according to some embodiments of the present disclosure, a corresponding learning rate can be calculated according to a gradient of a target machine. The performance of a weight update operation can be stopped if the learning rate is less than a preset threshold. That way, the training time can be shortened and the technical effect of reducing training costs can be achieved.

In some embodiments, the calculation unit 904 can be configured to calculate a learning rate corresponding to the gradient by calculating the learning rate according to the following formula: $Eta(i)=A \times i^{th}$ dimensional gradient$/(B+sqrt(sum(i^{th}$ dimensional gradient$\times i^{th}$ dimensional gradient$)))$. In the above formula, $Eta(i)$ is the learning rate, A is a first preset coefficient, B is a second preset coefficient, the gradient is a vector formed by n $i^{th}$ dimensional gradients, n is a number of dimensions of the gradient, and $0<i \leq n$.

According to some embodiments of the present disclosure, computer terminals that can be used for implementing the machine-exception handling methods provided by the present disclosure are provided. The computer terminal may be a computer terminal device in a computer terminal group. The computer terminal may also be a terminal device such as a mobile terminal. In some embodiments, the computer terminal may be one of a plurality of network devices located in a computer network.

In some embodiments, the computer terminal may execute program codes to perform the following procedures of an exemplary machine-exception handling method: acquiring a gradient consumption time of a target machine, wherein the gradient consumption time is used to indicate a gradient related time consumed by the target machine in a training process; determining whether the gradient consumption time satisfies a predetermined condition compared with a pre-acquired average consumption time, wherein the average consumption time is used to indicate an average value of the gradient related time consumed by all machines other than the target machine in a cluster in the training process; and determining that the target machine is abnormal if the gradient consumption time satisfies the predetermined condition compared with the average consumption time.

Figure 10:
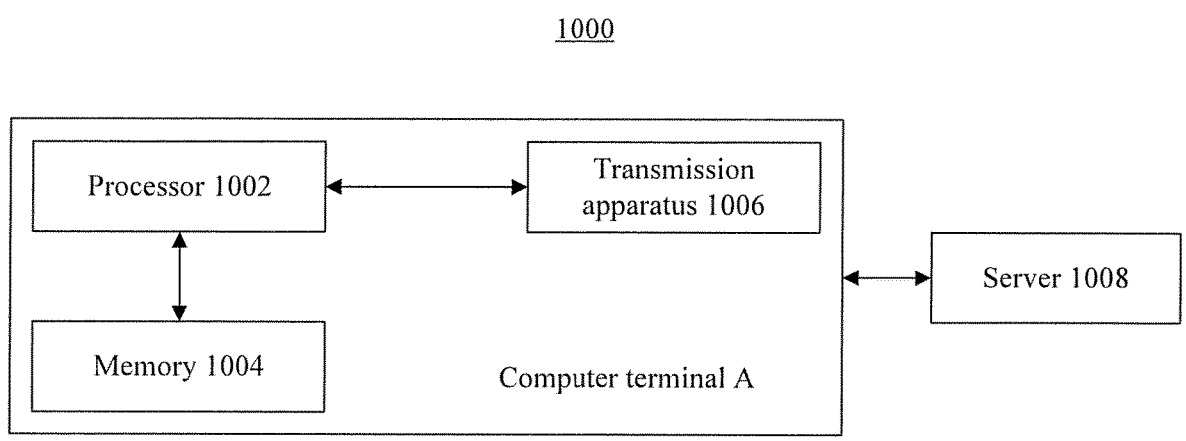
FIG. 10 is a structural block diagram of an exemplary computer terminal according to some embodiments of the present disclosure.

FIG. 10 is a structural block diagram of a computer terminal 1000 according to some embodiments of the present disclosure. As shown in FIG. 10, the computer terminal 1000 may include one or more (only one is shown in the figure) processors 1002, a memory 1004, and a transmission apparatus 1006. Computer terminal 1000 can connect to a server 1008, as shown in FIG. 10.

The memory 1004 can be configured to store software programs and program modules, for example, program instructions/program modules corresponding to the machine-exception handling methods and apparatuses provided in the present disclosure. The processor 1002 can be configured to run the software programs and the program modules stored in the memory 1004, to execute various functions and data processing procedures corresponding to the machine-exception handling methods. The memory 1004 may include a high-speed RAM, and may further include a non-volatile memory, for example, one or more magnetic storage apparatuses, flash memories, or other non-volatile solid-state memories. In some embodiments, the memory 1004 may further include memories that are remotely disposed relative to the processor. These remote memories may be connected to the terminal 1000 via a network. Examples of the foregoing network include, but are not limited to, the internet, an intranet, a local area network, a mobile communications network, and any combination thereof.

The transmission apparatus 1006 can be configured to receive or send data via a network. Examples of the foregoing network may include a wired network and a wireless network. In some embodiments, the transmission apparatus 1006 can includes a NIC, which can be connected to another network device or a router via a network cable to communicate with the internet or a local area network. Further, in some embodiments, the transmission apparatus 1006 can include an RF module configured to wirelessly communicate with the internet.

In some embodiments, the memory 1004 can be configured to store information about conditions related to the execution of certain procedures, access authorization of users, and application programs.

The processor 1002 may use the transmission apparatus 1006 to access the information and the application programs stored in the memory 1004 to perform, for example, the following steps: acquiring a gradient consumption time of a target machine, wherein the gradient consumption time is used to indicate a gradient related time consumed by the target machine in a training process; determining whether the gradient consumption time satisfies a predetermined condition compared with a pre-acquired average consumption time, wherein the average consumption time is used to indicate an average value of the gradient related time consumed by all machines other than the target machine in a cluster in the training process; and determining that the target machine is abnormal if the gradient consumption time satisfies the predetermined condition compared with the average consumption time.

In light of the above, according to some embodiments of the present disclosure, a gradient consumption time of a target machine can be compared with an average consumption time of all machines other than the target machine to determine whether the target machine is abnormal. When the target machine is abnormal, a training strategy can be adjusted in time to avoid increased training costs caused by low computation or communication speeds of some machines. That way, at least some of the objectives of efficiently determining an abnormal machine in a cluster can be achieved, and training costs can be reduced. Moreover, one of the technical problem of high training costs caused by low computation or communication speeds of some machines in the cluster can be solved.

It should be appreciated that the structure shown in FIG. 10 is only schematic and exemplary. The computer terminal may also be in the form of a terminal device such as a smartphone (such as an Android phone or an iOS phone), a tablet computer, a palmtop computer, a mobile internet device (MID), or a PDA. FIG. 10 does not limit the structure of the foregoing electronic apparatuses. For example, the computer terminal 1000 may further include more or fewer components than those shown in FIG. 10 (such as a network interface or a display apparatus) or have a configuration different from that shown in FIG. 10.

Further, it should be appreciated that all or a part of the steps described above in the exemplary embodiments may be implemented by a program that can be executed by hardware components of a terminal device. The program can be stored in a computer readable storage medium. The storage medium may include, for example, a flash drive, a ROM, a RAM, a magnetic disk, or an optical disc.

According to some embodiments of the present disclosure, computer terminals that can be used for implementing the learning rate adjustment methods provided by the present disclosure are provided. The computer terminal may be a computer terminal device in a computer terminal group. The computer terminal may also be a terminal device such as a mobile terminal. In some embodiments, the computer terminal may be one of a plurality of network devices located in a computer network.

For example, the computer terminal can be configured to execute program codes corresponding to the steps in an exemplary learning rate adjustment method: acquiring a gradient calculated by a target machine; calculating a learning rate corresponding to the gradient; determining whether the learning rate is less than a preset threshold; and stopping a weight update operation if the learning rate is less than the preset threshold, or performing the weight update operation if the learning rate is greater than or equal to the preset threshold.

The computer terminal may include one or more processors, a memory, and a transmission apparatus. The memory can be configured to store software programs and program modules, for example, program instructions/program modules corresponding to the learning rate adjustment methods and the apparatuses provided in the present disclosure. The processor can be configured to run the software programs and the program modules stored in the memory to execute various functional applications and data processing procedures related to the methods and apparatuses. The memory may include a high-speed RAM, and may further include a non-volatile memory, for example, one or more magnetic storage apparatuses, flash memories, or other non-volatile solid-state memories. In some embodiments, the memory may further include memories that are remotely disposed relative to the processor. These remote memories may be connected to the terminal via a network. Examples of the foregoing network include, but not limited to, the internet, an intranet, a local area network, a mobile communications network, and a combination thereof.

The transmission apparatus can be configured to receive or send data via a network. The foregoing network may include a wired network or a wireless network. In some embodiments, the transmission apparatus can include a NIC, which can be connected to another network device or a router via a network cable to communicate with the internet or a local area network. In some embodiments, the transmission apparatus can be an RF module, and can be configured to wirelessly communicate with the internet.

The memory can be configured to store information about conditions relating to execute of certain procedures, access authorization of users, and application programs.

The processor can use the transmission apparatus to access the information and the application programs stored in the memory to perform, for example, the following steps: acquiring a gradient calculated by a target machine; calculating a learning rate corresponding to the gradient; determining whether the learning rate is less than a preset threshold; and stopping a weight update operation if the learning rate is less than the preset threshold, or performing the weight update operation if the learning rate is greater than or equal to the preset threshold.

In light of the above, according to some embodiments of the present disclosure, a corresponding learning rate can be calculated according to a gradient of a target machine. The performance of a weight update operation can be stopped if the learning rate is less than a preset threshold. That way, the training time can be shortened and the technical effect of reducing training costs can be achieved.

It should be appreciated that the computer terminal may also be a terminal device such as a smartphone (such as an Android phone or an iOS phone), a tablet computer, a palmtop computer, a MID, and a PDA.

It is appreciated that all or a part of the steps in various methods of the foregoing embodiments can be implemented by a program instructing hardware components associated with a terminal device. The program may be stored in a computer readable storage medium. The storage medium can include, for example, a flash drive, a ROM, a RAM, a magnetic disk, or an optical disc.

According to some embodiments of the present disclosure, storage mediums are provided. For example, in some embodiments, the storage medium may be configured to store program codes related to the machine-exception handling method embodiments as described above.

In some embodiments, the storage medium may be located in a computer terminal within a computer terminal group in a computer network, or located in a mobile terminal within a mobile terminal group.

In some embodiments, the storage medium can be configured to store program codes used to perform the following steps: acquiring a gradient consumption time of a target machine, wherein the gradient consumption time is used to indicate a gradient related time consumed by the target machine in a training process; determining whether the gradient consumption time satisfies a predetermined condition compared with a pre-acquired average consumption time, wherein the average consumption time is used to indicate an average value of the gradient related time consumed by all machines other than the target machine in a cluster in the training process; and determining that the target machine is abnormal if the gradient consumption time satisfies the predetermined condition compared with the average consumption time.

In some embodiments, the gradient consumption time can include a first time consumed by the target machine to calculate a gradient and/or a second time consumed by the target machine to send the gradient. The storage medium can be further configured to store program codes used to perform the following steps: determining whether the first time is greater than a product of a first average value and a first preset coefficient. If the first time is greater than the product of the first average value and the first preset coefficient, it can be determined that the gradient consumption time satisfies the predetermined condition compared with the average consumption time. If the first time is less than or equal to the product of the first average value and the first preset coefficient, it can be determined that the gradient consumption time does not satisfy the predetermined condition compared with the average consumption time.

Additionally or alternatively, the storage medium can be further configured to store program codes used to perform: determining whether the second time is greater than a product of a second average value and a second preset coefficient. If the second time is greater than the product of the second average value and the second preset coefficient, it can be determined that the gradient consumption time satisfies the predetermined condition compared with the average consumption time. If the second time is less than or equal to the product of the second average value and the second preset coefficient, it can be determined that the gradient consumption time does not satisfy the predetermined condition compared with the average consumption time.

In some embodiments, the storage medium can be further configured to store program codes used to perform the following steps: acquiring the gradient calculated by all the machines other than the target machine; calculating a learning rate corresponding to the gradient; and determining, according to the learning rate, whether to perform a weight update operation.

In some embodiments, the storage medium can be further configured to store program codes used to perform the following steps: calculating the learning rate by using a formula $Eta(i) = A \times i^{th}$ dimensional gradient$/(B + sqrt(sum(i^{th}$ dimensional gradient$\times i^{th}$ dimensional gradient$)))$. In the above formula, $Eta(i)$ is the learning rate, A is the first preset coefficient, B is the second preset coefficient, the gradient is a vector formed by n $i^{th}$ dimensional gradients, n is a number of dimensions of the gradient, and $0 < i \leq n$.

In some embodiments, the storage medium can be further configured to store program codes used to perform the following steps: determining whether the learning rate is less than a preset threshold; and stopping the weight update operation if the learning rate is less than the preset threshold, or performing the weight update operation if the learning rate is greater than or equal to the preset threshold.

In some embodiments, the storage medium can be further configured to store program codes used to perform the following steps: calculating an updated weight according to the learning rate, the gradient, and a historical weight.

In some embodiments, the storage medium can be further configured to store program codes used to perform the steps of calculating the updated weight based on the following formula: updated weight=historical weight+(−learning rate×gradient).

In some embodiments, the storage medium can be further configured to store program codes used to perform the following steps: sending the updated weight to the target machine and all the machines other than the target machine to instruct the target machine and all the machines other than the target machine to perform training according to the updated weight.

According to some embodiment of the present disclosure, storage mediums are provided. In some embodiments, the storage medium may be configured to store program codes for performing the learning rate adjustment method embodiments described as described above.

In some embodiments, the storage medium may be located in a computer terminal within a computer terminal group in a computer network or located in a mobile terminal within a mobile terminal group.

In some embodiments, the storage medium can be configured to store program codes used to perform the following steps: acquiring a gradient calculated by a target machine; calculating a learning rate corresponding to the gradient; determining whether the learning rate is less than a preset threshold; and stopping a weight update operation if the learning rate is less than the preset threshold, or performing the weight update operation if the learning rate is greater than or equal to the preset threshold.

In some embodiments, the storage medium can be further configured to store program codes used to perform the steps of calculating the learning rate based on the following formula: Eta(i)=A×$i^{th}$ dimensional gradient/(B+sqrt(sum($i^{th}$ dimensional gradient×$i^{th}$ dimensional gradient))). In the above formula, Eta(i) is the learning rate, A is a first preset coefficient, B is a second preset coefficient, the gradient is a vector formed by n $i^{th}$ dimensional gradients, n is a number of dimensions of the gradient, and 0<i≤n.

In some embodiments, the storage medium can be further configured to store program codes used to perform the following steps: calculating an updated weight according to the learning rate, the gradient, and a historical weight.

In some embodiments, the storage medium can be further configured to store program codes used to perform the steps of calculating the updated weight based on the following formula: updated weight=historical weight+(−learning rate× gradient).

In some embodiments, the storage medium may include, but not limited to, any medium that can store program codes, such as a USB flash drive, a ROM, a RAM, a removable hard disk, a magnetic disk, or an optical disc. Further, reference may be made to the description above regarding the specific steps and procedures in the method embodiments.

It is appreciated that numbers used in the foregoing description are merely for the convenience of description. They do not imply any preference among different embodiments, or procedures associated therewith.

In the foregoing description, different examples may focus on different parts of the embodiments or the technical solutions. For a part that is not described in detail in a certain embodiment, reference may be made to related description in other embodiments.

In view of the exemplary embodiments provided in the present disclosure, it should be appreciated that the disclosed embodiments are only exemplary and may be implemented in other manners. For example, the unit division described herein is merely a logical function division. There may be other divisions in actual implementation. For example, a plurality of units or components may be combined or integrated into another system, or some features may be omitted or modified in some embodiments. In addition, the shown or discussed mutual couplings, direct couplings, or communication connections may be implemented by using some interfaces. The indirect couplings or communication connections between the units or modules may be implemented in electric or other forms.

The units or modules described as separate parts may or may not be physically separate, and parts shown as units may or may not be physical units. They may be located in one position or may be distributed on a plurality of network units. Further, a part or all of the units may be selected according to actual needs to achieve the objectives of the technical solutions of the present disclosure.

In addition, functional units in the embodiments of the present disclosure may be integrated into one processing unit, or each of the units may exist separately physically, or two or more units may be integrated into one unit. The integrated unit may be implemented either in the form of hardware or in the form of a software functional unit.

The integrated unit, if being implemented in the form of a software functional unit and sold or used as an independent product, may be stored in a computer readable storage medium. Based on such understanding, all or a part of the technical solutions according to the embodiments of the present disclosure may be implemented in the form of a software product. The computer software product may be stored in a storage medium, which can include several instructions for instructing a computer device (which may be a personal computer, a server, a network device, or the like) to perform all or a part of the steps of the method embodiments of the present disclosure. The storage medium may be any medium that can store program codes, such as a USB flash drive, a ROM, a RAM, a removable hard disk, a magnetic disk, or an optical disc.

The foregoing provides description of some exemplary embodiments of the present disclosure. It should be appreciated that those of ordinary skill in the art can make various modifications and improvements consistent with the present disclosure, without departing from the principle of the present disclosure. Such improvements and modifications should all fall within the protection scope of the present disclosure.

The invention claimed is:

1. A machine-exception handling method, comprising:
acquiring a gradient consumption time of a target machine of a cluster, the gradient consumption time indicating a gradient related time consumed by the target machine in a training process, wherein the gradient consumption time comprises at least one of a first time consumed by the target machine to determine a gradient or a second time consumed by the target machine to send the gradient;
determining whether the gradient consumption time satisfies a predetermined condition compared with an average consumption time, the average consumption time indicating an average value of the gradient related time consumed by machines other than the target machine in a cluster, wherein:
the average consumption time comprises at least one of a first average value of time consumed by the machines other than the target machine to determine a gradient or a second average value of time consumed by the machines other than the target machine to send the gradient, and
determining whether the gradient consumption time satisfies a predetermined condition compared with the average consumption time further comprises:

determining that the gradient consumption time satisfies the predetermined condition in response to the first time being greater than a product of the first average value and a first preset coefficient; or determining that the gradient consumption time satisfies the predetermined condition in response to the second time being greater than a product of the second average value and a second preset coefficient; and determining that the target machine is abnormal in response to the gradient consumption time satisfying the predetermined condition.

2. The method of claim 1, wherein after determining that the target machine is abnormal, the method further comprises:

acquiring a gradient determined by the machines other than the target machine;

determining a learning rate corresponding to the gradient; and determining, according to the learning rate, whether to perform a weight update operation.

3. The method of claim 2, wherein determining a learning rate corresponding to the gradient comprises:

determining the learning rate based on: $Eta(i)=A \times i^{th}$ dimensional gradient$/(B+\text{sqrt}(\text{sum}(i^{th}$ dimensional gradient$\times i^{th}$ dimensional gradient$)))$, wherein Eta(i) is the learning rate, A is the first preset coefficient, and B is the second preset coefficient.

4. The method of claim 2, wherein determining, according to the learning rate, whether to perform a weight update operation comprises:

comparing the learning rate to a preset threshold; and performing the weight update operation in response to the comparison between the learning rate and the preset threshold satisfying a first condition.

5. The method of claim 4, wherein performing the weight update operation comprises:

determining an updated weight according to the learning rate, the gradient, and a historical weight.

6. The method of claim 5, wherein determining an updated weight according to the learning rate, the gradient, and a historical weight comprises:

determining the updated weight based on: updated weight=historical weight+(−learning rate×gradient).

7. The method of claim 5, wherein after performing the weight update operation, the method further comprises:

sending the updated weight to the target machine and the machines other than the target machine to instruct the target machine and the machines other than the target machine to perform training according to the updated weight.

8. A learning rate adjustment method, comprising:

acquiring a gradient determined by a target machine;

determining a learning rate corresponding to the gradient, wherein determining a learning rate corresponding to the gradient comprise:

determining the learning rate based on: $Eta(i)=A \times i^{th}$ dimensional gradient$/(B+\text{sqrt}(\text{sum}(i^{th}$ dimensional gradient$\times i^{th}$ dimensional gradient$)))$, wherein Eta(i) is the learning rate, A is the first preset coefficient, and B is the second preset coefficient;

comparing the learning rate to a preset threshold; and performing the weight update operation in response to the comparison between the learning rate and the preset threshold satisfying a first condition.

9. The method of claim 8, wherein performing the weight update operation comprises:

determining an updated weight according to the learning rate, the gradient, and a historical weight.

10. The method of claim 9, wherein determining an updated weight according to the learning rate, the gradient, and a historical weight comprises:

determining the updated weight based on: updated weight=historical weight+(−learning rate×gradient).

11. A non-transitory computer readable medium that stores a set of instructions that is executable by at least one processor of a computer to cause the computer to perform a machine-exception handling method, comprising:

acquiring a gradient consumption time of a target machine of a cluster, the gradient consumption time indicating a gradient related time consumed by the target machine in a training process, wherein the gradient consumption time comprises at least one of a first time consumed by the target machine to determine a gradient or a second time consumed by the target machine to send the gradient;

determining whether the gradient consumption time satisfies a predetermined condition compared with an average consumption time, the average consumption time indicating an average value of the gradient related time consumed by machines other than the target machine in a cluster, wherein:

the average consumption time comprises at least one of a first average value of time consumed by the machines other than the target machine to determine a gradient or a second average value of time consumed by the machines other than the target machine to send the gradient, and determining whether the gradient consumption time satisfies a predetermined condition compared with the average consumption time further comprises:

determining that the gradient consumption time satisfies the predetermined condition in response to the first time being greater than a product of the first average value and a first preset coefficient; or determining that the gradient consumption time satisfies the predetermined condition in response to the second time being greater than a product of the second average value and a second preset coefficient; and determining that the target machine is abnormal in response to the gradient consumption time satisfying the predetermined condition.

12. The non-transitory computer readable medium according to claim 11, wherein after determining that the target machine is abnormal, the method further comprises:

acquiring a gradient determined by the machines other than the target machine;

determining a learning rate corresponding to the gradient; and determining, according to the learning rate, whether to perform a weight update operation.

13. The non-transitory computer readable medium according to claim 12, wherein determining a learning rate corresponding to the gradient comprises:

determining the learning rate based on: $Eta(i)=A \times i^{th}$ dimensional gradient$/(B+\text{sqrt}(\text{sum}(i^{th}$ dimensional gradient$\times i^{th}$ dimensional gradient$)))$, wherein Eta(i) is the learning rate, A is the first preset coefficient, and B is the second preset coefficient.

14. The non-transitory computer readable medium according to claim 12, wherein determining, according to the learning rate, whether to perform a weight update operation comprises:
- comparing the learning rate to a preset threshold; and
- performing the weight update operation in response to the comparison between the learning rate and the preset threshold satisfying a first condition.

15. The non-transitory computer readable medium according to claim 14, wherein performing the weight update operation comprises:
- determining an updated weight according to the learning rate, the gradient, and a historical weight.

16. The non-transitory computer readable medium according to claim 15, wherein determining an updated weight according to the learning rate, the gradient, and a historical weight comprises:
- determining the updated weight based on: updated weight=historical weight+(−learning rate×gradient).

* * * * *